United States Patent [19]

Forgione

[11] 3,867,259

[45] Feb. 18, 1975

[54] LACTATE DEHYDROGENASE TEST MATERIAL

[75] Inventor: Peter Salvatore Forgione, Stamford, Conn.

[73] Assignee: American Cyanamid Company, Stamford, Conn.

[22] Filed: Nov. 8, 1973

[21] Appl. No.: 414,035

[52] U.S. Cl. .......................... 195/99, 195/103.5 R
[51] Int. Cl. ...................... G01n 31/14, G01n 33/10
[58] Field of Search ...................... 195/103.5 R, 99

[56] References Cited
UNITED STATES PATENTS 2,999,052  9/1961  Albaum et al. .............. 195/103.5 R Primary Examiner—Alvin E. Tanenholtz
Attorney, Agent, or Firm—Frank M. Van Riet

[57] ABSTRACT

A diagnostic test indicator for the determination of the concentration of lactate dehydrogenase in sera comprising a bibulous material which has contained therein the dried residue resulting from the impregnation thereof with
1. a tetrazolium salt,
2. a chromatographic effect preventor,
3. an anti-oxidant,
4. diaphorase, and
5. a nicotinamide-adenine-dinucleotide- an alkali lactate salt mixture and a process for the production of said indicator, are disclosed.

17 Claims, No Drawings

LACTATE DEHYDROGENASE TEST MATERIAL

BACKGROUND OF THE INVENTION

The use of diagnostic tests in the clinical testing of patients has become increasingly common in recent years. Many of these tests employ the use of test papers wherein the individual conducting the test merely contacts a reactive paper strip with a suspect material, usually a body fluid, and observes the color change or color intensity thereof in order to determine whether or not a particular effect is achieved. Test strips or cards of this type have been devised for glucose determination and treponemal diseases, for example.

Available tests for the detection of the concentration of lactate dehydrogenase in body fluids have, until now, consisted of extremely complex liquid systems whereby test tubes, measuring devices, ultraviolet light, standardization of instruments, correction factors depending upon temperature and false readings prevail. There has therefore existed, for a substantial period of time, the need for a simple testing mechanism for the determination of the concentration of serum lactate dehydrogenase in body fluids, especially the blood, which long-felt need is satisfied by the instant invention more fully discussed hereinbelow. See U.S. Pat. No. 3,663,374 & Br. Pat. No. 1,318,568.

SUMMARY

As mentioned briefly above, I have now discovered a novel test means for the determination of the concentration of lactate dehydrogenase in body fluids. My test means is useful for the qualitative detection and quantitative determination of lactate dehydrogenase in sera wherein the test means comprises a reagent composition incorporated within a bibulous carrier.

The quantitative determination of lactate dehydrogenase is extremely important in the detection of heart diseases, especially heart attacks, in that, following heart attacks, the concentration of lactate dehydrogenase in the blood rises noticeably over its normal concentration. The early detection of such an abnormal rise in lactate dehydrogenase concentration can therefore obviously lead to a more accurate and rapid diagnosis of heart maladies.

Because early diagnosis of abnormal heart conditions is so important, a test for the detection of variables in the concentration of lactate dehydrogenase in the blood must be rapid and simple enough for the clinician to carry out but accurate enough to enable the diagnosis to be made without extreme changes of error or false readings. Such a mechanism is represented by the novel test indicators of the present invention. Utilizing my novel system, no instrumentation is necessary and no mixing or reconstitution of reagents is needed. Testing can therefore be conducted at home or in a doctor's office without any special equipment.

DESCRIPTION OF THE INVENTION INCLUDING PREFERRED EMBODIMENTS

The novel diagnostic test indicators for the determination of the concentration of lactate dehydrogenase, hereinafter sometimes referred to as LDH, in sera comprise a bibulous carrier material such as cellulosic paper which contains therein the dried residue resulting from the impregnation thereof with a series of reagent materials.

The first reagent material is a tetrazolium salt. This material is capable of imparting to the area of the test indicator contacted with serum a color of such varying intensity as to be representative of the concentration of the lactate dehydrogenase in the serum which is added to the indicator. These dyes are well known in the art and generally have the formula

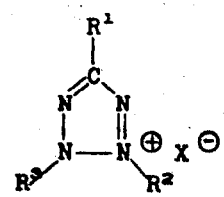

wherein $R^1$, $R^2$ and $R^3$, individually, are the same or different aryl or substituted aryl radicals and X is an anion such as a halide etc.

Examples of useful salts of this configuration include 2,3,5-Triphenyl-2H-tetrazolium chloride; 2-(p-iodophenyl)-3-(p-nitrophenyl)-5-phenyl-2H-tetrazolium chloride (INT); nitroblue tetrazolium; blue tetrazolium; and the like. These salts are incorporated into my novel indicator in concentrations ranging from about 0.05 part to about 0.35 part, preferably, from about 0.1 part to about 0.2 part, based on 100 parts of solution used, in a manner set forth hereinbelow.

The second reagent material incorporated into my novel indicator comprises a chromatographic effect preventor which is employed in order to prevent the chromatographic movement of the tetrazolium salt over the surface of the bibulous carrier material. Examples of materials which can be used for this purpose include poly(methacrylic acid), polyacrylic acid, carboxymethyl cellulose, copolymers of maleic acid and methylvinyl ether and the like. These materials are used in amounts ranging from about 0.1 part to about 3.0 parts, preferably from about 0.5 part to about 2.5 parts, based on 100 parts of solution used.

The third component impregnated into the bibulous strip is an anti-oxidant which is employed in order to prevent premature coloration of the tetrazolium salt component test indicator. Examples of suitable antioxidants include the alkylated phenols such as 2,6-ditertiary butyl-p-cresol; butylated hydroxytoluene, 4-t-butyl catechol, octadecyl-3,5-di-t-butyl-4-hydroxy hydrocinnamate; alkylidene bisphenols such as 2,2'-methylenebis (6-t-butyl-4-methyl phenol), 4,4'-butylidenebis (6-t-butyl-3-methyl phenol); thiobisphenols such as 4,4'-thiobis (6-t-butyl-3-methylphenol), 2,2'-thiobis (6-t-butyl-4-methyl phenol); polyphenols such as tetrakis [methylene (3,5-di-t-butyl-4-hydroxyhydrocinnamate)] methane, 1,3,5-trimethyl-2,4,6-tris (3,5-di-t-butyl-4-hydroxybenzyl) benzene; esters such as ditridecyl thiodipropionate, distearylthiodipropionate, dilaurylthiodipropionate; amines such as diaryl or dialkyl substituted p-phenylene diamines, diphenylamine, N-phenyl-α-naphthylamine; organic phosphites such as dibutyl phosphite, didecyl phosphite, dioctyl phosphite, diphenyldecyl phosphite, ditetradecyl phosphite, phenyldidecyl phosphite, phenylneopentyl phosphite, tridecyl phosphite, trilauryl trithiophosphite, triphenyl phosphite, trisnonyl phosphite and various other well known anti-oxidants such as the quinones including hydroquinone, hydroquinone monomethyl ether, mono-t-butylhydroquinone, 2,5-di-t-butyl hydroquinone, toluhydroquinone, 2,5-di-t-amyl hydroquinone and the like. I may also use phenothiazine, hydroxybenzophenone, p-dimethylaminonitrosobenzene, thiodipropionic acid etc.

These anti-oxidant materials are used in amounts ranging from about 0.01 part to 2.0 part, preferably from about 0.02 part to 1.0 part based on 100 parts of solution and may be used in conjunction with the tetrazolium salt or before or after deposition thereof.

The fourth component impregnated into the bibulous support is diaphorase which is used to catalyze the reduction of the tetrazolium salt with NADH. This enzyme is well known in the art and should be employed in concentrations ranging from about 0.02 part to 0.2 part by weight and is perferably used from 0.03 part to 0.10 part based on 100 parts of solution used.

Nicotinamide-adenine-dinucleotide, hereinafter sometimes referred to as NAD, in admixture with an alkali lactate salt such as lithium lactate, sodium lactate, potassium lactate and the like, comprises the fifth critical constituent of my novel indicator. The use of NAD is well known in the art and should be employed in concentrations ranging from about 0.01 part to about 0.20 part and is preferably used from 0.015 part to 0.08 part by weight based on 100 parts of solution. The lactate salt is employed in amounts ranging from 0.03 part to about 1.5 parts and is preferably used from 0.02 part to 0.09 part based on 100 parts of solution used.

The mechanism by which the instant test indicators function is not completely understood however, although not wishing to be bound by any expressed theory, it is believed that the reaction occurs thusly:

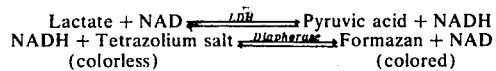

Lactate + NAD $\xrightleftharpoons{LDH}$ Pyruvic acid + NADH
NADH + Tetrazolium salt $\xrightarrow{Diaphorase}$ Formazan + NAD
(colorless) (colored)

It can therefore be seen that once the serum is added to the test indicator, the lactate dehydrogenase therein causes a reaction which results in the reduction of the tetrazolium salt and the formation of a colored indicator, the intensity of which is directly proportional to the concentration of the LDH. The clinician then merely compares the color which results to a standard color chart to ascertain the LDH concentration of the serum being tested.

In order to achieve optimum results utilizing the novel test indicators of the instant invention, it is also advantageous although not necessary, to incorporate into the bibulous carrier a suitable non-ionic wetting agent any of those which are well-known to the skilled artisan being applicable. For instance, I may utilize the fatty alkanolamides i.e. the alkanolamine reaction products with fatty acids such as lauric acid or stripped coconut fatty acid, suitable alkanolamines being diethanolamine, monoethanolamine, amonisopropanolamine and the like; the ethylene oxide derived materials, i.e. those derived from the reaction of ethylene oxide with alkylphenols wherein the alkyl group is octyl, nonyl or higher, long chain fatty alcohols such as tridecyl alcohol, lanolin, lecethin alcohol etc., long chain fatty acids such as tall oil, oleic acid, abietic acid etc., long chain fatty mercaptans, long chain fatty amines, polyoxypropylene glycol, fatty sorbitan ester; sugar esters i.e. the alcoholysis reaction products of the methyl ester of a fatty acid and sucrose or raffinose; polysorbitol; polyvinyl alcohol; methyl cellulose; ethoxylated phenol/formaldehyde resins and the like. Concentrations of from about 0.01 part to about 1.0 part of wetting agent per 100 parts of solution are employed, the wetting agents preferably being added with each component if the components are added singly or in admixture with the components if they are added as a complete admixed system.

In producing my novel test indicators, the method employed depends primarily on the material which is being employed as the anti-oxidant for the tetrazolium salt. If the anti-oxidant is organic solvent soluble only, the dry bibulous carrier, usually paper, is impregnated with the reagents in a series of dips.

An aqueous solution of the tetrazolium salt and the chromatographic effect preventor is prepared and the bibulous material is contacted therewith at a pH ranging from about 7.5 to about 8.8, preferably about 7.5 to about 7.8. The impregnated material is then dried such as in drying tunnel or forced draft oven and the dried, impregnated carrier is then contacted with an organic solvent solution of the anti-oxidant. The carrier is again dried. A buffer solution of diaphorase and, preferably, a carbohydrate stabilizer, at a pH of about 7.0 to about 7.5, preferably about 7.2 to about 7.5 is then prepared and the twice impregnated, twice dried carrier is impregnated for a third time therewith and dried. A buffer solution of the NAD and alkali lactate at a pH of about 8.8 is prepared and the treated paper is again impregnated. A fourth drying completes the preparation of the test indicator.

If wetting agents etc. are to be incorporated, they are added during any or all of the impregnations to obtain uniform reagent deposits. Materials suitable as the carbohydrate stabilizer include maltose and sorbitol as well as water soluble polymeric ethylene oxides both high and low molecular weight, diethylene glycol and the like in concentrations ranging from about 10.0 parts to about 25.0 parts, preferably about 15.0 parts to about 20.0 parts based on 100 parts of solution used.

When a water-soluble anti-oxidant is to be employed, all the reagents may be admixed together in the buffer solution the concentrations of each ingredient being as set forth above except that each is based on the same 100 parts of water, and a one dip-one dry cycle can be employed to product the desired test indicator.

Example of buffers useful in either procedure include, phosphate buffer, phthalate buffer, tris buffer, citratephosphate buffer, borate-succinate buffer etc. The preferred buffer is tris buffer i.e. 2-amino-2-(hydroxymethyl)-1,3-propanediol in a 0.05 to 0.2M concentrations.

The color change of the test indicators prepared according to the multi-dip process is from pink to red while the color change of the one-dip method proceeds from yellow to brown.

The above concentrations expressed in connection with the components which may be incorporated into my novel indicators are set forth as to the solutions of these components which are saturated onto the bibulous carrier only and are not meant to specify the amount of each component which is eventually present on the bibulous carrier. That is to say, saturation of the bibulous carrier with specific concentration of a specific component in solution will not unequivocally incorporate into the bibulous carrier the same amount or percentage of component present in the solution. I have found however, that the above concentrations of solution are generally sufficient so as to incorporate sufficient component into the bibulous material upon saturation therewith to produce a functional test indicator, the absorptive capabilities of the bibulous material being characteristic of materials generally used for this purpose.

Although the above discussion with regard to the preparation of my novel indicators teaches saturation of the bibulous material by dipping, it is sometimes necessary, especially wherein a series of saturations are to be conducted, to apply the component solution to the bibulous carrier rather than dipping the carrier because extended dippings may tend to wash out previously deposited components.

The following examples are set forth for purposes of illustration only and are not to be construed as limitations on the present invention except as set forth in the appended claims. All parts and percentages are by weight unless otherwise specified.

EXAMPLE 1

Commercially available cellulose paper 200 mm. square, 0.0195–0.0205 in. thick, 245–255 g./m$^2$ in weight, having an absorbancy of 9–20 sec. using 0.1 ml. of water according to TAPPI test T432 and expanding less than 2.5% in cross-direction when wetted with water is saturated with a solution containing 0.19 part of 2-(p-iodophenyl)-3-(p-nitrophenyl)-5-phenyl-2H-tetrazolium chloride (INT), 0.03 part of polyoxyethylene (20) cetyl ether as wetting agent, and 0.50 part of polymethacrylic acid dissolved in 100 parts of water, pH 7.5. The above treated paper is dried under vacuum at room temperature (26°C.) in the dark and dipped in a second solution containing 1.0 part dilaurylthiodipropionate anti-oxidant and 100 parts of hexane. This paper is again dried and dipped in a third solution containing 0.09 part of diaphorase, 20.0 parts of maltose and 0.54 part of the same wetting agent dissolved in 100 parts of .05M tris buffer i.e. 2-amino-2-(hydroxymethyl)-1,3 propane diol pH 7.2.

The multi-treated paper is dried and a fourth coating added, composed of 0.08 part of nicotinamide-adenine dinucleotide (NAD), 0.025 part of additional wetting agent and 0.84 part of lithium lactate in 100 parts of water, pH 8.8. The final paper, colorless to faint pink, gives a red spot on testing a series of test sera, the intensity of color of each resultant test being proportional to the amount of LDH present therein.

EXAMPLE 2

An aqueous solution (100 parts) containing 2.0 parts of polymethacrylic acid, 1.0 part of tris(2-amino-2-(hydroxymethyl)-1,3 propane diol), 20.0 parts of maltose, 0.025 part of polyoxyethylene (20) cetyl ether, 0.08 part of NAD, 0.160 part of INT tetrazolium salt, 0.50 part of p-dimethylaminonitrosobenzene as an anti-oxidant, 0.05 part of diaphorase and 1.5 parts of a 60% solution of lithium lactate is prepared with a final pH of 8.6. The cellulosic filter paper of Example 1 is then dipped in this solution and the saturated paper dried under vacuum at room temperature in the dark. The dry yellow paper, on testing with serum containing LDH, results in a brown spot, the intensity of the brown color depending on the concentration of LDH present. This paper is suitable for determining semi-quantitative amounts of LDH serum.

EXAMPLES 3–13

The procedure of Example 1 is again followed except that the ingredients are varied to the extent set forth in Table I, below. Each indicator produced contains diaphorase and NAD as set forth in Example 1. The concentration, in parts per 100 parts of water or solvent, of each component is indicated therewith. In each instance, an excellent test indicator is produced.

TABLE I

| Ex. | Tetrazolium Salt | Chromatographic Effect Preventor | Anti-Oxidant | Alkali Lactate | Non-Ionic Wetting Agent | Carbohydrate Stabilizer |
|---|---|---|---|---|---|---|
| 3 | Same as Ex. 1-0.30 | Carboxymethyl cellulose-2.0 | 2,6-di-t-butyl-p-cresol-0.80 | Same as Ex. 1 | — | — |
| 4 | do. | do. | 2,2'-methylenebis (6-t-butyl-4-methyl phenol)-2.0 | do. | — | — |
| 5 | Nitroblue tetrazolium-0.15 | do. | do. | do. | — | Sorbitol-25.0 |
| 6 | do. | Polyacrylic acid-0.75 | N-phenyl-α-naphylamine-1.5 | do. | Lauric acid-ethanolamine reaction product-1.0 | do. |
| 7 | do.-0.20 | Same as Ex. 1 | Dibutyl phosphite-2.0 | do. | do. | — |
| 8 | 2,3,5-triphenyl-2H tetrazolium chloride-0.08 | Copolymer of maleic acid and methyl vinyl ethyl (75/25)-3.0 | 2,2'-thiobis (6-t-butyl-4-methyl phenol)-0.5 | Sodium lactate-0.05 | Ethylene oxide-tall oil reaction product-0.5 | Diethylene glycol-15.0 |
| 9 | do.-0.26 | do. | do. | do. | Polyvinyl alcohol-0.1 | — |
| 10 | Same as Ex. 1 | do. | Thiodipropionic acid-0.5 | do.-1.5 | Polysorbitol-0.75 | Maltose-10.0 |
| 11 | Blue Tetrazolium-0.35 | do. | Phenothiazine-1.0 | Potassium lactate-0.1 | — | do. |
| 12 | Same as Ex. 1 | Carboxymethyl cellulose-0.15 | do. | do. | Methyl cellulose-1.0 | do. |
| 13 | do. | do.-1.0 | Hydroxylenzophenone-0.01 | do.-0.03 | — | — |

I claim:

1. A diagnostic test indicator for the determination of the concentration of lactate dehydrogenase in sera comprising a bibulous material which contains therein the dried residue resulting from the impregnation thereof with
   1. a tetrazolium salt,
   2. a chromatographic effect preventor,
   3. an anti-oxidant,
   4. diaphorase and
   5. a nicotinamide-adenine-dinucleotide-alkali lactate salt mixture.

2. A diagnostic test indicator according to claim 1 wherein said (1) is 2-(p-iodophenyl)-3-(p-nitrophenyl)-5-phenyl-2H-tetrazolium chloride.

3. A diagnostic test indicator according to claim 1 wherein said (2) is poly(methacrylic acid).

4. A diagnostic test indicator according to claim 1 wherein said (3) is p-dimethylaminonitrosobenzene.

5. A diagnostic test indicator according to claim 1 wherein said (3) is dilaurylthiodipropionate.

6. A diagnostic test indicator according to claim 1 wherein said alkali lactate salt is lithium lactate.

7. A diagnostic test indicator according to claim 1 wherein the bibulous material additionally contains (6) a carbohydrate stabilizer for said diaphorase.

8. A diagnostic test indicator according to claim 1 wherein the bibulous material additionally contains (7) a nonionic wetting agent.

9. A process for the preparation of the diagnostic test indicator of claim 1 which comprises impregnating a bibulous material with an aqueous solution of said (1) and (2), thereafter drying the thus impregnated material, impregnating the thus impregnated material with an organic solvent solution of said (3), thereafter drying the thus twice impregnated material, impregnating the this twice impregnated material with a solution of said (4), thereafter drying the thrice impregnated material, and then impregnating the thus thrice impregnated material with (5) and drying the thus four times impregnated material.

10. A process according to claim 9 wherein said organic solvent is hexane or chloroform.

11. A process according to claim 9 wherein said (1) is 2-(p-iodophenyl)-3-(p-nitrophenyl)-5-phenyl 2H-tetrazolium chloride.

12. A process according to claim 9 wherein said (2) is poly(methacrylic acid).

13. A process according to claim 9 wherein said (3) is p-dimethylaminonitrosobenzene.

14. A process according to claim 9 wherein said (3) is dilauryethiodipropionate.

15. A process according to claim 9 wherein said alkali lactate salt is lithium lactate.

16. A diagnostic test indicator according to claim 1 wherein said bibulous material is paper.

17. A process according to claim 9 wherein said bibulous material is paper.

* * * * *